United States Patent Office 3,686,133
Patented Aug. 22, 1972

3,686,133
DISPERSING COMPOSITION
Kenichi Hattori and Tyoji Yamakawa, Wakayama-shi, and Akitoshi Tuji, Wakayama-ken, Japan, assignors to Kao Soap Co., Ltd., Tokyo, Japan
No Drawing. Filed May 15, 1970, Ser. No. 37,938
Claims priority, application Japan, Aug. 21, 1969, 44/66,151
Int. Cl. B01f 17/00, 17/12; C04b 13/00
U.S. Cl. 252—354          3 Claims

ABSTRACT OF THE DISCLOSURE

A composition of matter, useful as a cement dispersing agent, consists essentially of (a) a salt of a high molecular condensation product of naphthalenesulfonic acid and formaldehyde, containing not more than 8 weight percent of unreacted naphthalenesulfonic acid and not less than 70 weight percent of high molecular weight condensates having more than five naphthalene nuclei, and (b) a salt of gluconic acid. The cement dispersing agent is mixed with a hydraulic cement composition in order to form cement paste, mortar, concrete or the like.

BACKGROUND OF THE INVENTION

Field of the invention

This invention relates to a novel dispersing agent composition to be incorporated in a hydraulic cement-based mixture for obtaining an easily dispersable hydraulic cement composition suitable for making portland cement, concrete, mortar and grout having excellent strength and workability. Further, this invention relates to a process for improving the properties of hydraulic cement-based mixtures by adding a combination of a salt of a high molecular weight condensation product of naphthalenesulfonic acid with formaldehyde and a salt of gluconic acid to the cement mixture, such as cement paste, mortar, concrete and the like.

In the following description and claims, the term "cement" shall refer to silicate cement compositions including portland cement, pozzuolanic cements, hydraulic limes and natural cements. The term "naphthalenesulfonic acid" shall refer to naphthalene-α-sulfonic acid and naphthalene-β-sulfonic acid. The term "nucleus" or derivatives thereof shall refer to a sulfonated naphthalene radical.

Description of the prior art

Whatever form it may take—cement paste, mortar, or concrete—an excellent hydraulic cement-based mixture should give fully satisfactory results in the three aspects of durability, strength, and economy. It is well known that, if the requirements for durability and strength are to be met adequately, aside from the cost-saving aspects, it is of paramount importance to use a minimum amount of water in order to make the hydraulic cement-based mixture of the proper flowable consistency or workability for the intended use.

With a view to reducing the amount or proportion of such mixing water for the reason above stated, so-called water-reducing agents have been commonly used in the preparation of mortar and concrete.

Presumably, the mechanism by which the proportion of mixing water required is reduced by the incorporation of water reducing agents is that the water reducing effect is achieved synergistically by the following two actions. One action is that of the cement dispersing agent which disperses the cement particles themselves and increases the fluidity of the resulting cement paste to permit the attainment of the same adequate workability with less water than otherwise. The other action is that of an air-entraining (AE) agent which produces minute disconnected air bubbles in mortar, concrete, and the like to increase the fluidity of the cement-based mixture with the aid of the air bubbles, which act like ball bearings, in order thereby to effect a corresponding decrease in the amount of water required.

Accordingly, many of the water-reducing agents in practical use consist of a cement dispersing agent and an AE agent, and their effects as such depend largely on the latter component.

However, the water-reducing effect of an AE agent is governed by the amount of air that can be thereby entrained, and it is clear that the effect is enhanced by increasing the amount of air entrained. However, this is accompanied by a corresponding decrease in the strength of the hydraulic cement and, for this reason, the entrainable amount of air in concrete or the like and, hence, the water-reducing effect, to be achieved by the use of an AE agent is limited.

If an improved water-reducing effect is to be realized, it is of prime importance to find an excellent dispersing agent for cement particles.

SUMMARY OF THE INVENTION

We have previously found that salts of high (molecular weight) condensation products of naphthalenesulfonic acid-formaldehyde are remarkably effective for the dispersion of cement particles and such cement dispersing agents are commercially available (refer to Japanese Pat. No. 485,391 and German Pat. No. 1,238,831). We have now discovered that a composition comprised of (a) a salt of a high (molecular weight) condensation product of naphthalenesulfonic acid-formaldehyde and (b) a salt of gluconic acid has a greatly increased cement dispersing action. The present invention is based on this discovery.

The term "salt of high (molecular weight) condensation product of naphthalenesulfonic acid-formaldehyde" as used herein shall mean an alkali metal salt, such as the sodium and potassium salts, or an alkaline earth metal salt, such as the calcium salt, of a high molecular weight condensation product produced by condensing naphthalenesulfonic acid and formaldehyde, which condensation product contains less than 8 weight percent of unreacted naphthalenesulfonic acid and contains more than 70 weight percent of high molecular weight condensates having more than five naphthalene nuclei. Such salts of high molecular weight condensation products of naphthalenesulfonic acid-formaldehyde are disclosed in the above Japanese and German patents as excellent cement dispersing agents.

The high molecular weight condensation product of naphthalneesulfonic acid-formaldehyde which may be used in this invention can be prepared in such a manner as described below. That is to say, naphthalenesulfonic acid and formaldehyde (formalin) are first condensed in the presence of a sulfuric acid catalyst in a conventional manner (e.g., by the method described in PB Report, FIAT Final Report No. 1141) and, upon the solidification of the reaction mixture due to the progress of the condensation reaction, appropriate amounts of water, formalin and the catalyst are added to the mixture and the reaction is carried out further until a highly condensed product is obtained. The condensation product has a residual content of the mononucleus compound (unreacted naphthalenesulfonic acid) of not more than 8 percent by weight, or preferably not more than 5 percent by weight, and the content of high molecular weight condensates having five or more naphthalene nuclei is not less than 70 weight percent, based on the total amount of the condensation product.

For example, such a high molecular weight condensation product can be synthesized by using 1.8 mols of concentrated sulfuric acid and one mol of formaldehyde for each mol of naphthalene in the following manner.

128 g. of naphthalene is melted with heat and is kept at a temperature between 120° and 125° C. 128 g. of 98 percent sulfuric acid (specific gravity: 1.84) is added dropwise to the melt over a period of about one hour. After this, the mixture is caused to react at 160° C. for 3 hours, and then cooled to 120° C. and 96.6 g. of water is added. Next, 51 g. of 98 percent sulfuric acid is added, and the temperature is lowered to 80° C. While the mixture is maintained at a temperature between 80° and 85° C., 81.8 g. of 37 percent formalin is added dropwise over a period of 3 hours. Following the addition of the formalin, the temperature of the mixture is increased to 95° to 100° C. over a period of about 1 hour, and then the reaction is continued for 25 hours at that temperature.

The numbers of naphthalene nuclei in the condensate synthesized in this manner were as follows:

| Number of naphthalene nuclei | Content in the product (percent by weight) | |
|---|---|---|
| 1 | 1.5 | |
| 2 | 0.8 | |
| 3 | 1.6 | 5.9 |
| 4 | 3.5 | |
| 5 | 4.5 | |
| 6 | 4.0 | 92.6 |
| 7 | 84.1 | |

Before use, the condensation product should be converted either to a calcium salt by liming or to a sodium salt by sodation.

Further details of the high condensation products of naphthalenesulfonic acid and formaldehyde to be used in the present invention and the preparation thereof are described in the above-referenced German and Japanese patents.

The salts of gluconic acid, which are to be used in the composition of this invention, include the sodium, lithium, potassium and calcium salts of gluconic acid.

The mixing ratio of (a) the salt of the high (molecular weight) condensation product of naphthalenesulfonic acid-formaldehyde to (b) the salt of gluconic acid, in the dispersing agent composition according to the present invention, is preferably in the range of about 30 to 90 percent (all references herein to "percent" refer to percent by weight) of the former (a) to about 70 to 10 percent of the latter (b), although said ranges are not so critical. The dispersing agent composition of the invention may be employed either in the form of a dehydrated powder or in the form of an aqueous solution of a concentration of up to about 50 percent. It may be added to the cement in an amount of 0.01 to 2.0 percent, preferably 0.2 to 0.5 percent, based on the amount of the cement.

The dispersing agent composition according to the invention may be either premixed in the hydraulic cement or added to concrete, mortar, cement paste or the like at the time of mixing. It may be used alone or in combination with other auxiliary agents such as a hardening accelerator, a retarder and an AE agent.

The addition of the dispersing agent composition according to the present invention is extremely beneficial to the dispersibility of hydraulic cement, and permits a remarkable reduction in the amount of the mixing water required to form a hydraulic cement-based mixture for use as mortar and concrete.

This invention is illustrated by the following examples, in which the high (molecular weight) condensation product of naphthalenesulfonic acid-formaldehyde used is the product prepared in the process as above described and consists of 1.5 percent of mononucleus compound, 5.9 percent of two- to four-nucleus compounds, and 92.6 percent of five- and more polynucleus compounds. All percentages are by weight.

EXAMPLE 1

Flow tests of ordinary portland cement compositions containing mixtures of different proportions of (a) a high (molecular weight) condensation product of naphthalenesulfonic acid-formaldehyde and (b) a gluconate were conducted.

To 500 g. portions of ordinary portland cement were added 145 cc. portions of water containing 0.1, 0.2, 0.25 and 0.5 percent by weight, on the basis of the cement weight, respectively, of mixtures of different proportions of the sodium salt of the high condensation product of naphthalenesulfonic acid-formaldehyde and sodium gluconate. Each mixture was mixed in a mortar mixer for 3 minutes. Then, it was placed on a flow table and was subjected to a total of 15 vertical up and down oscillations at a rate of one oscillation per second to see how the cement paste spread, according to ASTM standard C-124-39. The results of the obtained flow values of cement were as listed in Table 1.

As can be seen from Table 1, the combined use of the sodium salt of the high condensation product of naphthalenesulfonic acid-formaldehyde and sodium gluconate leads to a great improvement in the dispersion effect as compared with the cases where either component is used alone.

TABLE 1

| Composition (percent) | | Amount added to cement (percent by weight) | | | |
|---|---|---|---|---|---|
| Sodium salt of high condensation product of naphthalenesulfonic acid-formaldehyde | Sodium gluconate | 0.1 | 0.2 | 0.25 | 0.5 |
| | | Millimeters | | | |
| 100 | 0 | 178 | 190 | 207 | 289 |
| 90 | 10 | 173 | 180 | 229 | 297 |
| 80 | 20 | 191 | 252 | 270 | 295 |
| 70 | 30 | 180 | 233 | 250 | 279 |
| 60 | 40 | 190 | 201 | 238 | 270 |
| 50 | 50 | 189 | 197 | 224 | 253 |
| 40 | 60 | 189 | 195 | 221 | 234 |
| 30 | 70 | 180 | 188 | 214 | 220 |
| 20 | 80 | 184 | 186 | 205 | 209 |
| 10 | 90 | 184 | 186 | 203 | 209 |
| 0 | 100 | 184 | 185 | 198 | 199 |
| 0 | 0 | 168 | | | |

EXAMPLE 2

In the same manner as described in Example 1, cement flow tests were conducted with the following additive compositions to compare their dispersion effects. The results are shown in Table 2.

TABLE 2

| Additive | Amount added, percent (on basis of cement weight) | | | | | | | | | |
|---|---|---|---|---|---|---|---|---|---|---|
| | 0.1 | 0.2 | 0.3 | 0.4 | 0.5 | 0.6 | 0.7 | 0.8 | 0.9 | 1.0 |
| A, mm | 182 | 277 | 296 | [1]>300 | >300 | >300 | >300 | >300 | >300 | >300 |
| B, mm | 180 | 262 | 284 | >300 | >300 | >300 | >300 | >300 | >300 | >300 |
| C, mm | 178 | 203 | 236 | 268 | 276 | 282 | 288 | >300 | >300 | >300 |
| D, mm | 177 | 182 | 189 | 192 | 190 | 190 | 189 | 188 | 187 | 188 |
| E, mm | | 198 | 212 | 214 | 212 | 208 | 206 | 203 | 200 | 19t |

[1] The diameter of the flow table used in the test for determining flow values of cemen was 300 mm and, accordingly, the flow values more than 300 could not be determined, as the spread cement paste will run over the table in such cases and such flow values were merely indicated as >300 in the table.

Additive compositions:

(A) a mixture of 80 parts (parts are by weight, here

Composition of concrete: as shown in Table 3

TABLE 3

| Additive | Amount added | | Water/ cement ratio (percent) | Sand/ aggregate ratio (percent) | Water (kg.) | Cement (kg.) | Fine aggregate (S) (kg.) | Coarse aggregate (G) (kg.) |
|---|---|---|---|---|---|---|---|---|
| | Grams | On basis of cement (percent) | | | | | | |
| None | | | 42.2 | 40 | 178 | 420 | 702 | 1,039 |
| F | 840 | 0.20 | 39.3 | 40 | 165 | 420 | 704 | 1,047 |
| | 1,050 | 0.25 | 38.1 | 40 | 160 | 420 | 712 | 1,062 |
| | 1,260 | 0.30 | 37.4 | 40 | 157 | 420 | 722 | 1,075 |
| C | 840 | 0.20 | 40.5 | 40 | 170 | 420 | 689 | 1,024 |
| | 1,050 | 0.25 | 40.2 | 40 | 169 | 420 | 689 | 1,027 |
| | 1,260 | 0.30 | 39.0 | 40 | 164 | 420 | 715 | 1,065 |
| G | 840 | 0.20 | 40.5 | 40 | 170 | 420 | 689 | 1,024 |
| | 1,050 | 0.25 | 40.2 | 40 | 169 | 420 | 689 | 1,027 |
| | 1,260 | 0.30 | 39.0 | 40 | 167 | 420 | 691 | 1,029 |

Test results: as shown in Table 4

TABLE 4

| Additive | Amount added on basis of cement (percent) | Slump (cm.) | Air content (percent) | Water reducing (percent) | Compression strength (kg./cm.$^2$) | | |
|---|---|---|---|---|---|---|---|
| | | | | | 3rd day | 7th day | 28th day |
| None | | 4.2 | 1.6 | | 234 | 322 | 477 |
| F | 0.20 | 4.0 | 2.0 | 7.0 | 303 | 440 | 536 |
| | 0.25 | 4.0 | 2.4 | 10.0 | 315 | 446 | 559 |
| | 0.30 | 4.6 | 2.5 | 12.0 | 328 | 448 | 589 |
| C | 0.20 | 4.7 | 1.6 | 4.5 | 292 | 406 | 518 |
| | 0.25 | 4.1 | 1.8 | 5.0 | 300 | 413 | 522 |
| | 0.30 | 5.3 | 1.5 | 8.0 | 313 | 415 | 535 |
| G | 0.20 | 4.1 | 2.1 | 4.5 | 295 | 415 | 513 |
| | 0.25 | 4.0 | 2.0 | 5.0 | 291 | 389 | 409 |
| | 0.30 | 4.2 | 2.0 | 6.0 | 299 | 397 | 514 | and hereafter) of sodium salt of high condensation product of naphthalenesulfonic acid-formaldehyde and 20 parts of sodium gluconate (B) a mixture of 80 parts of calcium salt of high condensation product of naphthalenesulfonic acid-formaldehyde and 20 parts of sodium gluconate (C) sodium salt of high condensation product of naphthalenesulfonic acid-formaldehyde (D) sodium gluconate (E) calcium lignisulfonate As will be apparent from Table 2, the dipsersion effects which the compositions A and B according to the present invention can achieve for cement are much greater than those which can be attained by the individual components of the compositions alone and the effect by a typical known cement dispersant, i.e. calcium ligninsulfonate.

EXAMPLE 3

Concrete tests were performed with the following admixtures or additive compositions:

(F) a mixture of 70 patrs of the sodium salt of a high condensation product of naphthalenesulfonic acid-formaldehyde and 30 parts of sodium gluconate (C) sodium salt of high condensation product of naphthalenesulfonic acid-formaldehyde (G) commercially aviable water-reducing agent of ligninsulfonic acid type Materials used:
Cement: ordinary portland cement made by Oska Cement Co., Japan
Sand (fine aggregate): said obtained from the Kinokawa basin, Japan, sp. gr.: 2.58, f.m.: 3.00
Gravel (coarse aggregate): crusher run from Gobo, Japan, sp. gr.: 2.56

As clearly indicated in Table 4, the compositions according to the present invention are remarkably advantageous in enhancing both the water-reducing and cement strengthening effects over the lignin sulfonate-type water-reducing agent (G) in widest use and the high condensation product of naphthalenesulfonic acid-formaldehyde (C) alone.

In the hydraulic cement composition including the dispersing agent of the present invention, the relative amounts of the materials comprising the cement composition are not critical and can be selected in wide ranges depending on desired qualities of the concrete. The operative ranges of the amounts of cement and other materials in the cement composition are the followings, which have been generally used in conventional hydraulic cement compositions.

Cement: 200–500 kg./m.$^3$

Fine aggregate: 500–900 kg./m.$^3$

Coarse aggregate: 600–1700 kg./m.$^3$

AE agent: 0.005–0.1% by wt. based on the amount of the cement

Retarder: 0.01–0.1% by wt. based on the amount of the cement

The embodiments of the invention in which an exclusive property or privilege is claimed are defined as follows:

1. A dispersing composition consisting essentially of (a) from about 30 to about 90 percent by weight of an alkali metal salt or an alkaline earth metal salt of a high molecular weight condensation product of naphthalenesulfonic acid and formaldehyde, containing not more than 8 weight percent of unreacted naphthalenesulfonic acid and not less than 70 weight percent of high molecular weight condensates having more than five naphthalene nuclei, and (b) the balance of the composition being the sodium, lithium, potassium or calcium salt of gluconic acid.

2. A composition as claimed in claim 1, in which said alkali metal salt is the sodium salt.

3. A composition as claimed in claim 1, in which said alkaline earth metal salt is the calcium salt.

References Cited

UNITED STATES PATENTS 2,556,540 6/1951 Henn et al. -------- 252—356 X
3,154,466 10/1964 Nothum ---------- 252—353 X RICHARD D. LOVERING, Primary Examiner U.S. Cl. X.R.

106—90, 314; 252—353, DIG 11